(12) United States Patent
Koshizuka et al.

(10) Patent No.: US 9,490,627 B2
(45) Date of Patent: Nov. 8, 2016

(54) MAGNETIZING INRUSH CURRENT SUPPRESSING DEVICE

(71) Applicant: KABUSHIKI KAISHA TOSHIBA, Minato-ku (JP)

(72) Inventors: Tadashi Koshizuka, Saitama (JP); Shiro Maruyama, Yokohama (JP); Minoru Saito, Kamakura (JP); Hiroyuki Maehara, Fuchu (JP); Koji Suzuki, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 92 days.

(21) Appl. No.: 14/559,307

(22) Filed: Dec. 3, 2014

(65) Prior Publication Data

US 2015/0085404 A1    Mar. 26, 2015

Related U.S. Application Data

(63) Continuation of application No. PCT/JP2013/062430, filed on Apr. 26, 2013.

(30) Foreign Application Priority Data

Jun. 11, 2012    (JP) ................................ 2012-132382

(51) Int. Cl.
*H02H 9/00*        (2006.01)
*H01H 33/44*        (2006.01)
(Continued)

(52) U.S. Cl.
CPC ............ *H02H 9/002* (2013.01); *H01H 33/022* (2013.01); *H01H 33/44* (2013.01); *H01H 33/59* (2013.01); *H01H 33/593* (2013.01)

(58) Field of Classification Search
CPC .................. H02H 7/04; H02H 9/002
USPC ................................. 361/35, 93.9
See application file for complete search history.

(56) References Cited

U.S. PATENT DOCUMENTS 8,217,536 B2 *   7/2012  Koshizuka ............. H02H 9/002
                                                   307/113
2004/0124814 A1 *  7/2004  Tsutada ...................... G05F 1/12
                                                   323/247

(Continued)

FOREIGN PATENT DOCUMENTS

CN    101563744 A    10/2009
CN    102163841 A     8/2011
(Continued)

OTHER PUBLICATIONS

International Preliminary Report on Patentability and Written Opinion issued Dec. 24, 2014 in PCT/JP2013/062430.

(Continued)

*Primary Examiner* — Stephen W Jackson
*Assistant Examiner* — Christopher Clark
(74) *Attorney, Agent, or Firm* — Oblon, McClelland, Maier & Neustadt, L.L.P.

(57) ABSTRACT

According to one embodiment, a magnetizing inrush current suppressing device includes, a first closing unit closes the circuit-breaker at the notable phase by the first phase determined by the first-phase determination unit, a second-phase determination unit determines a second phase at which the notable phase detected by the notable phase detection unit from the three-phase AC voltage measured by the power-supply-side voltage measurement unit becomes a zero point after the first phase determined by the first-phase determination unit, and a second closing unit closes the circuit-breaker at two phases other than the notable phase by the second phase determined by the second-phase determination unit.

6 Claims, 3 Drawing Sheets

(51) Int. Cl.
*H01H 33/59* (2006.01)
*H01H 33/02* (2006.01)

(56) References Cited

U.S. PATENT DOCUMENTS

| | | | | |
|---|---|---|---|---|
| 2009/0097173 A1* | 4/2009 | Kinoshita | H02H 9/002 | 361/35 |
| 2010/0039737 A1* | 2/2010 | Koshizuka | H02H 9/002 | 361/36 |
| 2010/0085668 A1* | 4/2010 | Kinoshita | H02H 9/002 | 361/35 |
| 2010/0141235 A1* | 6/2010 | Koshiduka | H02H 9/002 | 323/355 |
| 2011/0181989 A1* | 7/2011 | Udagawa | H02H 9/002 | 361/35 |
| 2011/0211288 A1* | 9/2011 | Koshizuka | H02H 9/002 | 361/91.1 |
| 2012/0236443 A1* | 9/2012 | Kinoshita | H01H 9/563 | 361/36 |
| 2013/0155553 A1* | 6/2013 | Kawasaki | H01F 27/42 | 361/35 |
| 2013/0163125 A1* | 6/2013 | Udagawa | H01H 9/563 | 361/35 |

FOREIGN PATENT DOCUMENTS

| | | |
|---|---|---|
| JP | 2004-208394 A1 | 7/2004 |
| JP | 2006-284261 A1 | 10/2006 |
| JP | 2008-160100 A1 | 7/2008 |
| JP | 2009-099347 A1 | 5/2009 |
| JP | 2010-020985 A1 | 1/2010 |
| JP | 2012-043711 A1 | 3/2012 |
| JP | 2013-037767 A1 | 2/2013 |
| JP | 2014-143049 A1 | 8/2014 |
| WO | WO 2012/023524 A1 | 2/2012 |
| WO | WO 2012/026423 A1 | 3/2012 |

OTHER PUBLICATIONS

Combined Office Action and Search Report issued on Dec. 10, 2015 in Chinese Patent Application No. 201380030704.7 with English translation.

International Search Report issued on Jun. 11, 2013 for PCT/JP2013/062430 filed on Apr. 26, 2013 with English Translation.

International Written Opinion issued on Jun. 11, 2013 for PCT/JP2013/062430 filed on Apr. 26, 2013.

Brunke, John H., et al., "Elimination of Transformer Inrush Currents by Controlled Switching—Part I: Theoretical Considerations," *IEE Transactions on Power Delivery*, vol. 16, No. 2, Apr. 2001.

* cited by examiner

MAGNETIZING INRUSH CURRENT SUPPRESSING DEVICE

CROSS-REFERENCE TO RELATED APPLICATIONS

This application is a Continuation Application of PCT Application No. PCT/JP2013/062430, filed Apr. 26, 2013 and based upon and claiming the benefit of priority from Japanese Patent Application No. 2012-132382, filed Jun. 11, 2012, the entire contents of all of which are incorporated herein by reference.

FIELD

Embodiments described herein relate generally to a magnetizing inrush current suppressing device for suppressing a magnetizing inrush current to be generated when powering on a transformer.

BACKGROUND

It is generally known that a large magnetizing inrush current flows when non-load magnetizing is performed by power-on while a transformer core has a residual magnetic flux. The magnitude of this magnetizing inrush current is several times as large as the rated load current of the transformer. The system voltage fluctuates if a large magnetizing inrush current like this flows. If this voltage fluctuation is large, it may have an influence on users.

As a method of suppressing this magnetizing inrush current, a method is known in which when turning on a directly grounded three-phase transformer by using three single-phase circuit-breakers, one arbitrary phase is first closed, and then two remaining phases are closed, thereby suppressing a magnetizing inrush current.

There is also a known method in which a circuit-breaker of a reference phase is closed at a timing at which a prospective magnetic flux and residual magnetic flux of the reference phase match, and then two remaining circuit-breakers are closed with a delay so as to minimize the difference between a prospective magnetic flux and residual magnetic flux of each of other phases.

There is, however, a circuit-breaker in which a capacitor is connected in parallel between the poles in order to facilitate current interruption. When shutting down a transformer by this circuit-breaker in which the capacitor is connected between the poles, it is difficult for the above-described methods to suppress a magnetizing inrush current for the following reason.

When shutting down a transformer by the circuit-breaker in which a capacitor is connected between the poles, an AC voltage having a small amplitude appears at a transformer terminal after shutdown due to the inter-pole capacitor. This AC voltage is a power supply voltage divided by the inter-pole capacitor and the stray capacitance of the transformer. In this state, the residual magnetic flux of the transformer is obtained by superposing a component of this small-amplitude AC voltage on a DC component.

When the residual magnetic flux is thus obtained by superposing the AC component on the DC component, it is difficult to obtain the intersection of the residual magnetic flux and prospective magnetic flux as described above. This is so because the DC component of the residual magnetic flux changes in accordance with the breaking phase of the circuit-breaker, and the magnitude of the AC component changes in accordance with the capacitance of the inter-pole capacitor.

Under the circumstances, it is desired to provide a magnetizing inrush current suppressing device capable of suppressing a transformer magnetizing inrush current to be generated when powering on a transformer by using a circuit-breaker in which a capacitor is connected between the poles.

DETAILED DESCRIPTION

Embodiments will be described with reference to the drawings.

In general, according to one embodiment, there is provided a magnetizing inrush current suppressing device for controlling a circuit-breaker which opens and closes a connection between a three-phase transformer and a three-phase AC power supply and in which a capacitor is connected between poles, to suppress a magnetizing inrush current. The magnetizing inrush current suppressing device includes: a transformer-side voltage measurement unit configured to measure a three-phase AC voltage on the three-phase transformer side of the circuit-breaker; a residual magnetic flux DC component calculation unit configured to calculate DC components of residual magnetic fluxes of three phases of the three-phase transformer after the three-phase transformer is shut down, based on the three-phase AC voltage measured by the transformer-side voltage measurement unit; a notable phase detection unit configured to detect, as a notable phase, a phase having one of a maximum absolute value and a minimum absolute value from among the DC components of the residual magnetic fluxes of the three phases calculated by the residual magnetic flux DC component calculation unit; a power-supply-side voltage measurement unit configured to measure a three-phase AC voltage on the power supply side of the circuit-breaker; a first-phase determination unit configured to determine a first phase at which the notable phase detected by the notable phase detection unit from the three-phase AC voltage measured by the power-supply-side voltage measurement unit takes a peak value having a polarity opposite to a polarity of the DC component of the notable phase of the residual magnetic flux calculated by the residual magnetic flux DC component calculation unit; a first closing unit configured to close the circuit-breaker at the notable phase by the first phase determined by the first-phase determination unit; a second-phase determination unit configured to determine a second phase at which the notable phase detected by the notable phase detection unit from the three-phase AC voltage measured by the power-supply-side voltage measurement unit becomes a zero point after the first phase determined by the first-phase determination unit; and a second closing unit configured to close the circuit-breaker at two phases other than the notable phase by the second phase determined by the second-phase determination unit.

Embodiments of the present invention will be explained below with reference to the accompanying drawings.

Figure 1:
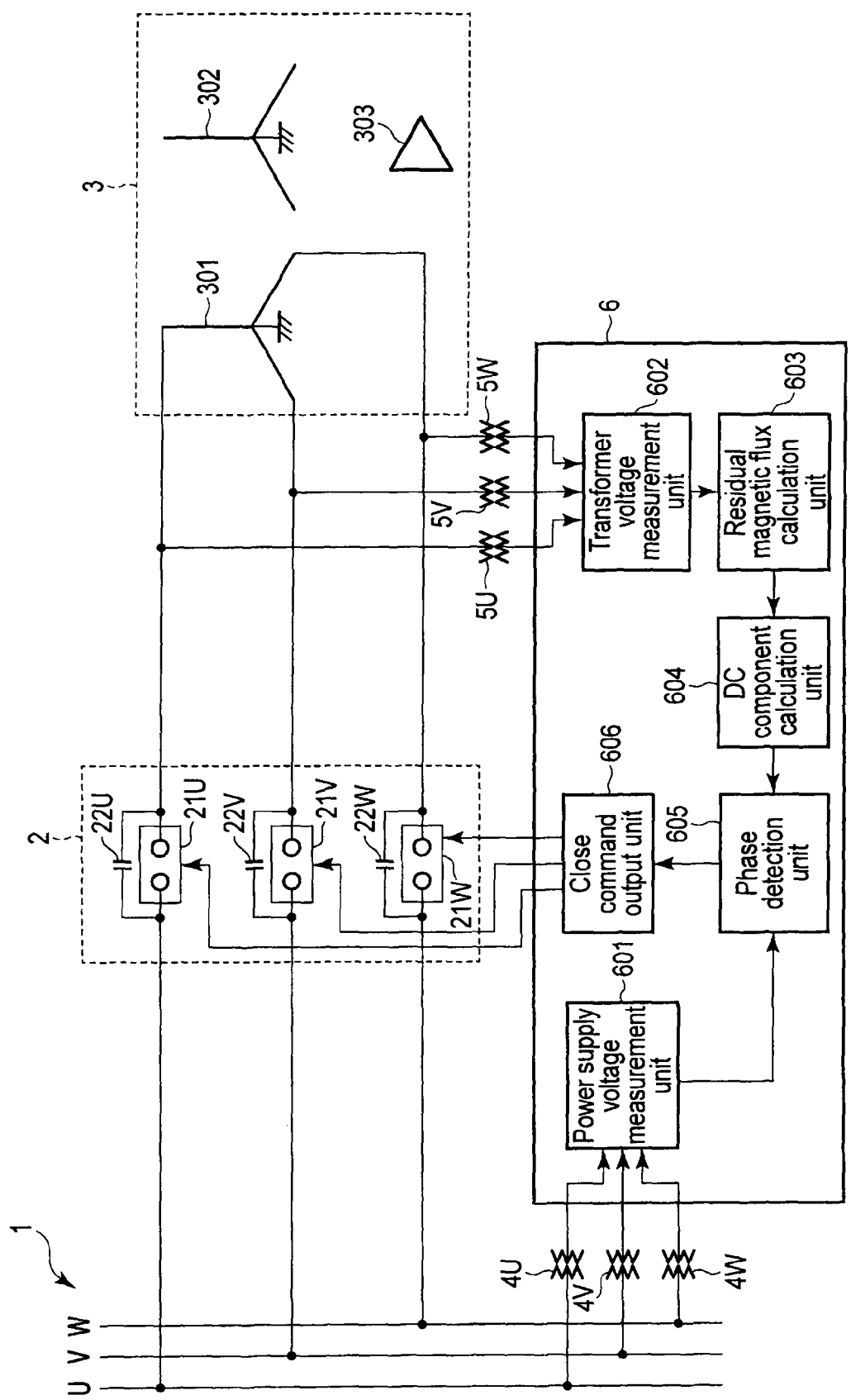
FIG. 1 is a block diagram showing the configuration of a power system to which a magnetizing inrush current suppressing device according to an embodiment of the present invention is applied.

FIG. 1 is a view showing the configuration of a power system to which a magnetizing inrush current suppressing device 6 according to the embodiment of the present invention is applied. Note that the same reference numerals denote the same parts in the following drawings, a detailed explanation thereof will be omitted, and different portions will mainly be described.

The power system according to this embodiment includes a power supply bus 1, a three-phase circuit-breaker 2, a transformer 3, power supply voltage detectors 4U, 4V, and 4W of three phases, transformer terminal voltage detectors 5U, 5V, and 5W of three phases, and a magnetizing inrush current suppressing device 6.

The power supply bus 1 is the bus of a power system including a three-phase AC power supply having U, V, and W phases.

The primary side of the transformer 3 is connected to the power supply bus 1 via the circuit-breaker 2. The transformer 3 is a three-winding, three-phase transformer for transforming a three-phase AC voltage. The transformer 3 includes primary, secondary, and tertiary windings 301, 302, and 303. The primary and secondary windings 301 and 302 are connected by a Y-connection. The tertiary winding 303 is connected by a Δ connection. The neutral point of the primary winding 301 and the secondary winding 302 is grounded.

The circuit-breaker 2 is installed between the power supply bus 1 and transformer 3. The circuit-breaker 2 is a single-phase operation type circuit-breaker which individually operates main contact points 21U, 21V, and 21W of the U, V, and W phases. Inter-pole capacitors 22U, 22V, and 22W are respectively connected in parallel to the main contact points 21U, 21V, and 21W of the circuit-breaker 2. The inter-pole capacitors 22U, 22V, and 22W are formed to facilitate current interruption by the circuit-breaker 2. When the circuit-breaker 2 is closed, the transformer 3 is powered on by the power supply bus 1. When the circuit-breaker 2 is opened, the transformer 3 is blocked from the power supply bus 1, but is electrically connected to the power supply bus 1 by the inter-pole capacitors 22U, 22V, and 22W.

The three power supply voltage detectors 4U, 4V, and 4W are installed for the individual phases (U, V, and W phases) of the power supply bus 1. The power supply voltage detectors 4U, 4V, and 4W are measurement devices for measuring the phase voltages (ground voltages) of the individual phases (U, V, and W phases) of the power supply bus 1. For example, the power supply voltage detectors 4U, 4V, and 4W are voltage dividers such as VTs (Voltage Transformers) or PDs (Potential Devices). The power supply voltage detectors 4U, 4V, and 4W are connected between ground and the individual phases of the power supply bus 1. The power supply voltage detectors 4U, 4V, and 4W output detected values as detection signals to the magnetizing inrush current suppressing device 6.

The three transformer terminal voltage detectors 5U, 5V, and 5W are measurement devices for measuring ground voltages (phase voltages) Vtu, Vtv, and Vtw of the terminals (U, V, and W phases) on the primary side of the transformer 3. For example, the transformer terminal voltage detectors 5U, 5V, and 5W are voltage dividers such as VTs (Voltage Transformers) or PDs (Potential Devices). The transformer terminal voltage detectors 5U, 5V, and 5W are formed for the individual phases of the primary terminals of the transformer 3. The transformer terminal voltage detectors 5U, 5V, and 5W output detected values as detection signals to the magnetizing inrush current suppressing device 6.

The magnetizing inrush current suppressing device 6 outputs a close command to the main contacts 21U to 21W of the phases of the circuit-breaker 2 based on the detection signals received from the power supply voltage detectors 4U, 4V, and 4W and transformer terminal voltage detectors 5U, 5V, and 5W. Consequently, the circuit-breaker 2 is closed.

The arrangement of the magnetizing inrush current suppressing device 6 will be explained with reference to FIGS. 1, 2, 3 and 4.

Figure 2:
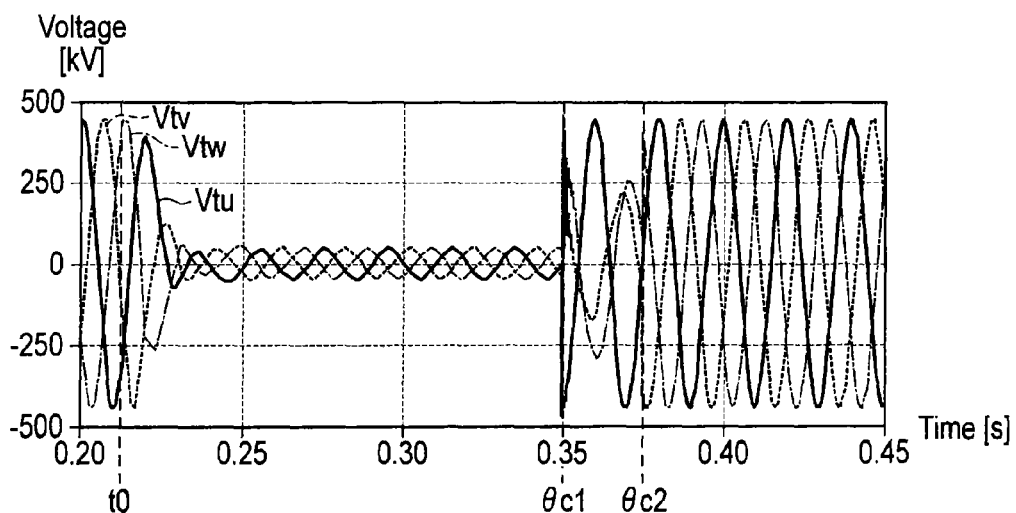
FIG. 2 is a waveform chart showing the phase voltage of a transformer from shutdown to power-on of the transformer by a circuit-breaker according to the embodiment.
Figure 3:
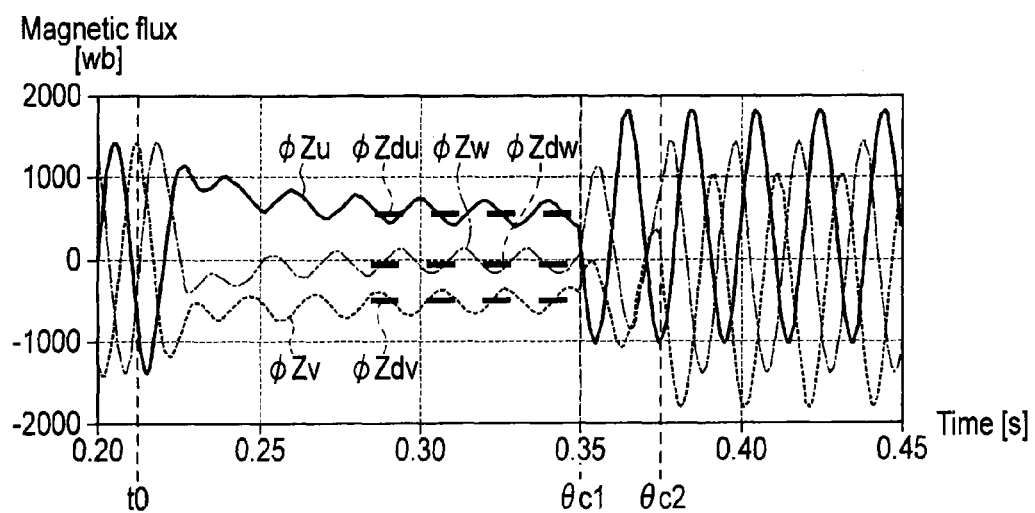
FIG. 3 is a waveform chart showing the residual magnetic flux of the core of the transformer from shutdown to power-on of the transformer by the circuit-breaker according to the embodiment.
Figure 4:
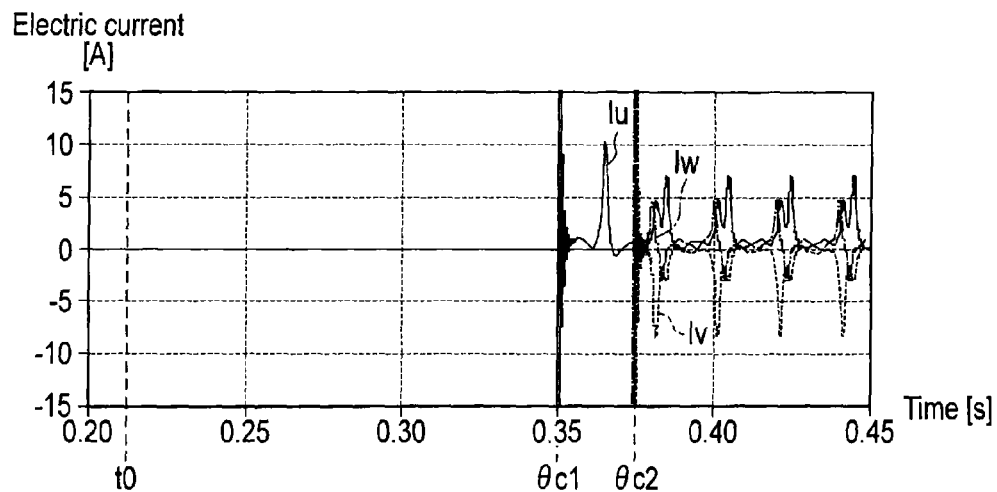
FIG. 4 is a waveform chart showing a circuit-breaker current flowing through the circuit-breaker from shutdown to power-on of the transformer by the circuit-breaker according to the embodiment.

FIGS. 2, 3, and 4 show states from shutdown to power-on of the transformer 3 by the circuit-breaker 2. FIG. 2 is a waveform chart showing the phase voltages Vtu, Vtv, and Vtw of the transformer 3. FIG. 3 is a waveform chart showing residual magnetic fluxes φZu, φZv, and φZw of the core of the transformer 3, and DC components φZdu, φZdv, and φZdw of these magnetic fluxes. FIG. 4 is a waveform chart showing circuit-breaker currents Iu, Iv, and Iw flowing through the circuit-breaker 2. Time t0 indicates the breaking point of the transformer 3 (the open point of the circuit-breaker 2).

The magnetizing inrush current suppressing device 6 includes a power supply voltage measurement unit 601, transformer voltage measurement unit 602, residual magnetic flux calculation unit 603, DC component calculation unit 604, phase detection unit 605, and close command output unit 606.

The power supply voltage measurement unit 601 measures the individual phase voltages Vu, Vv, and Vw of the power supply bus 1 based on the detection signals detected by the power supply voltage detectors 4U, 4V, and 4W. The power supply voltage measurement unit 601 outputs the measured individual phase voltages Vu, Vv, and Vw to the phase detection unit 605.

The transformer voltage measurement unit 602 measures the phase voltages Vtu, Vtv, and Vtw on the primary side of the transformer 3 based on the detection signals detected by the transformer terminal voltage detectors 5U, 5V, and 5W. The transformer voltage measurement unit 602 outputs the measured phase voltages Vtu, Vtv, and Vtw on the primary side of the transformer 3 to the residual magnetic flux calculation unit 603.

Based on the phase voltages Vtu, Vtv, and Vtw measured by the transformer voltage measurement unit 602, the residual magnetic flux calculation unit 603 integrates the phase voltage Vtu, Vtv, and Vtw of the U, V, and W phases after the transformer 3 is shut down by the circuit-breaker 2. The residual magnetic flux calculation unit 603 sets the integrated values as the residual magnetic fluxes (primary-side phase magnetic fluxes) φZu, φZv, and φZw of the core of the transformer 3. The residual magnetic flux calculation unit 603 outputs the calculated residual magnetic fluxes φZu, φZv, and φZw to the DC component calculation unit 604.

The DC component calculation unit 604 calculates the DC components φZdu, φZdv, and φZdw from the residual magnetic fluxes $\phi Zu$, $\phi Zv$, and $\phi Zw$ of the individual phases calculated by the residual magnetic flux calculation unit 603. The DC component calculation unit 604 outputs the calculated DC components $\phi Zdu$, $\phi Zdv$, and $\phi Zdw$ of the residual magnetic fluxes to the phase detection unit 605.

The phase detection unit 605 receives the DC components $\phi Zdu$, $\phi Zdv$, and $\phi Zdw$ of the residual magnetic fluxes of the individual phases calculated by the DC component calculation unit 604, and the individual phase voltages Vu, Vv, and Vw of the power supply bus 1 measured by the power supply voltage measurement unit 601. The phase detection unit 605 detects the U phase as a notable phase which is a phase having the largest absolute value among the DC components $\phi Zdu$, $\phi Zdv$, and $\phi Zdw$ of the residual magnetic fluxes of the individual phases. Note that a phase having the largest absolute value among the DC components $\phi Zdu$, $\phi Zdv$, and $\phi Zdw$ is the notable phase in this embodiment, but a phase having the smallest absolute value may be the notable phase. The phase detection unit 605 detects a phase at which the detected notable phase of the phase voltages Vu, Vv, and Vw of the power supply bus 1 has a peak value having a polarity opposite to that of the DC components $\phi Zdu$, $\phi Zdv$, and $\phi Zdw$ of the notable phase. The phase detection unit 605 outputs an indication of the detected notable phase and an amount of the phase to the close command output unit 606.

The close command output unit 606 sets the phase detected by the phase detection unit 605 as a target close phase $\theta c1$ in the notable phase of the circuit-breaker 2. As shown in FIG. 3, the target close phase $\theta c1$ is a point of time at which the residual magnetic flux $\phi Zu$ of the U phase of the notable phase is close to zero due to an AC component. At the target close phase $\theta c1$, the close command output unit 606 closes only the notable phase of the circuit-breaker 2. After closing the circuit-breaker 2 at the notable phase, the close command output unit 606 closes the two remaining phases other than the notable phase at a target close phase $\theta c2$. The target close phase $\theta c2$ is the phase of the zero point of the notable phase after the elapse of a preset time from the target close phase $\theta c1$ as the notable phase.

Based on the target close phases $\theta c1$ and $\theta c2$, the close command output unit 606 outputs a close command to an operation mechanism for driving the main contact point of the phase to be closed of the circuit-breaker 2. Consequently, the main contact point of the phase to be closed of the circuit-breaker 2 is closed. By closing the circuit-breaker 2 at the phases in the two stages as described above, as shown in FIG. 4, the close command output unit 606 suppresses the circuit-breaker currents (magnetizing inrush current) Iu, Iv, and Iw of the individual phases to about a few amperes.

Figure 5:
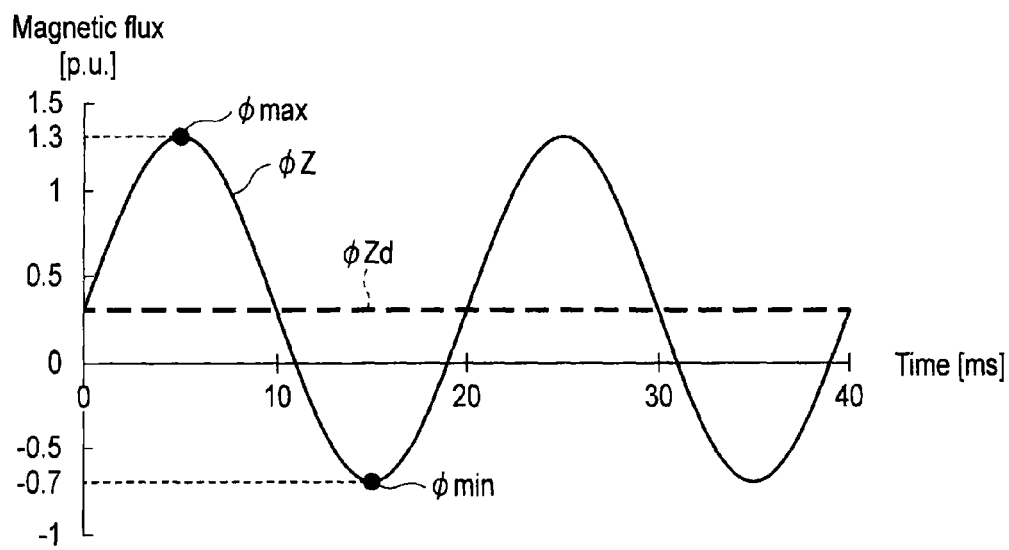
FIG. 5 is a waveform chart showing the residual magnetic flux of one phase of the transformer according to the embodiment and the DC component of the residual magnetic flux.

With reference to FIG. 5, an example of the method of calculating the DC components $\phi Zdu$, $\phi Zdv$, and $\phi Zdw$ from the residual magnetic fluxes $\phi Zu$, $\phi Zv$, and $\phi Zw$ of the individual phases by the DC component calculation unit 604 will be explained.

FIG. 5 is a waveform chart showing the residual magnetic flux $\phi Z$ of one phase of the transformer 3 and the DC component $\phi Zd$ of this magnetic flux. Referring to FIG. 5, the residual magnetic flux $\phi Z$ represents one arbitrary phase of the residual magnetic fluxes $\phi Zu$, $\phi Zv$, and $\phi Zw$ of the three phases. Also, the DC component $\phi Zd$ is the DC component of the residual magnetic flux $\phi Z$.

The DC component calculation unit 604 detects a maximum magnetic flux (positive peak value) $\phi$max and minimum magnetic flux (negative peak value) $\phi$min during one period from the waveform of the residual magnetic flux $\phi Z$. The DC component calculation unit 604 calculates the DC component $\phi Zd$ by dividing the sum of the maximum magnetic flux $\phi$max and minimum magnetic flux $\phi$min by 2. In FIG. 5, the maximum magnetic flux $\phi$max is 1.3 [p.u.], and the minimum magnetic flux $\phi$min is −0.7 [p.u.]. Accordingly, the DC component $\phi Zd$ is (1.3−0.7)/2=0.3 [p.u.].

In this embodiment, the target close phases $\theta c1$ and $\theta c2$ for closing the circuit-breaker 2 can be decided without detecting the intersection of the prospective magnetic flux and residual magnetic flux. Accordingly, even the circuit-breaker 2 in which the inter-pole capacitors 22U, 22V, and 22W are connected in parallel to the main contact points 21U, 21V, and 21W can suppress the magnetizing inrush current of the transformer 3, which is generated when powering on the transformer 3.

Note that in this embodiment, the various parameters in phase control by the magnetizing inrush current suppressing device 6 may also be corrected in order to, e.g., further increase the accuracy. For example, when the circuit-breaker 2 is closed, a preceding discharge called pre-arc occurs between the main contacts, or the close time varies due to, e.g., operation variations of the operation mechanisms. By pre-acquiring the characteristics of the close variation caused by the pre-arc and the variation when the circuit-breaker is closed, these variations can be corrected by using their characteristics when performing phase control. By performing this correction, a magnetizing inrush current can be suppressed more reliably even when these variations occur.

Also, the inter-pole capacitors 22U, 22V, and 22W have been explained as parts of the circuit-breaker 2 in this embodiment, but the present invention is not limited to this arrangement. These capacitors need only be connected in parallel to the main contact points of the circuit-breaker, and may also be parts separate from the circuit-breaker. In addition, the three phases need not be integrated in the circuit-breaker 2, and three circuit-breakers formed for the individual phases may also be used.

Furthermore, in the embodiment, an example of the method of calculating the DC components $\phi Zdu$, $\phi Zdv$, and $\phi Zdw$ from the residual magnetic fluxes $\phi Zu$, $\phi Zv$, and $\phi Zw$ of the individual phases by the DC component calculation unit 604 has been explained. However, the present invention is not limited to this. The DC components $\phi Zdu$, $\phi Zdv$, and $\phi Zdw$ can be calculated from the residual magnetic fluxes $\phi Zu$, $\phi Zv$, and $\phi Zw$ by any method. Also, if the values of the DC components $\phi Zdu$, $\phi Zdv$, and $\phi Zdw$ can be determined to such an extent that the polarities and the relationship between the values of the individual phases are known, correct values of the DC components $\phi Zdu$, $\phi Zdv$, and $\phi Zdw$ need not be calculated.

For example, the DC component calculation unit 604 need not divide the sum of the maximum magnetic flux $\phi$max and minimum magnetic flux $\phi$min by 2. Even by using a value not divided by 2, the phase detection unit 605 can determine the notable phase and the polarity of the DC component of the residual magnetic flux of the notable phase. In addition, the DC component calculation unit 604 can obtain the maximum magnetic flux $\phi$max and minimum magnetic flux $\phi$min during two or more periods instead of one period. It is also possible to calculate the average of a plurality of positive peak values (or a plurality of negative peak values), instead of the maximum magnetic flux $\phi$max (or minimum magnetic flux $\phi$min). Furthermore, the DC component calculation unit 604 may also calculate the DC components $\phi Zdu$, $\phi Zdv$, and $\phi Zdw$ from the deviation of the polarities of the instantaneous values of the residual magnetic fluxes $\phi Zu$, $\phi Zv$, and $\phi Zw$. More specifically, when the polarity is positive, the polarities of the instantaneous values of the residual magnetic fluxes φZu, φZv, and φZw are often positive; when the polarity is negative, the polarities of the instantaneous values of the residual magnetic fluxes φZu, φZv, and φZw are often negative. Also, when the DC components φZdu, φZdv, and φZdw are close to zero, the positive and negative polarities of the instantaneous values of the residual magnetic fluxes φZu, φZv, and φZw are almost even. Accordingly, the polarities and values of the DC components φZdu, φZdv, and φZdw can be determined by using these properties.

In the embodiment, the power supply voltage detectors 4U, 4V, and 4W measure the phase voltages Vu, Vv, and Vw of the power supply bus 1. However, it is also possible to measure the individual line voltages of the power supply bus 1, and convert the line voltages into the phase voltages Vu, Vv, and Vw. This similarly applies to the transformer terminal voltage detectors 5U, 5V, and 5W. Accordingly, the transformer terminal voltage detectors 5U, 5V, and 5W may also measure the line voltages of the tertiary winding 303 of a Δ-connection.

In addition, in the embodiment, the phase voltages Vu, Vv, and Vw of the power supply bus 1 are measured based on the detection signals detected by the power supply voltage detectors 4U, 4V, and 4W. However, the present invention is not limited to this. The phase voltages Vu, Vv, and Vw of the power supply bus 1 may also be measured based on the detection signals detected by the transformer terminal voltage detectors 5U, 5V, and 5W. More specifically, the phase voltages Vu, Vv, and Vw of the power supply bus 1 may also be measured based on small-amplitude AC voltages to be superposed on the transformer terminals by the inter-pole capacitors 22U, 22V, and 22W.

Also, in this embodiment, the transformer 3 can be any transformer as long as it is a three-phase transformer. The transformer 3 is not limited to a three-winding transformer and may also be a two-winding transformer or a transformer having four or more windings. In addition, the connection of each winding can be either a Y-connection or Δ connection, and it is possible to use any combination of these connections.

Furthermore, in this embodiment, the calculation order and the calculation locations (e.g., computers and various detectors, regardless of whether inside or outside of the magnetizing inrush current suppressing device 6) can be changed as needed, provided that the same results are obtained.

While certain embodiments according to the present invention have been described, these embodiments have been presented by way of example only, and are not intended to limit the scope of the invention. The novel embodiments described herein may be implemented in a variety of other forms, and various omissions, substitutions, and/or changes may be made therein without departing from the spirit of the inventions. The accompanying claims and their equivalents are intended to cover such forms or modifications as would fall within the scope and spirit of the inventions.

What is claimed is:

1. A magnetizing inrush current suppressing device for controlling a circuit-breaker which opens and closes a connection between a three-phase transformer and a three-phase AC power supply and in which a capacitor is connected between poles of the circuit-breaker, to suppress a magnetizing inrush current, comprising:
    a transformer-side voltage measurement unit configured to measure a three-phase AC voltage on the three-phase transformer side of the circuit-breaker;
    a residual magnetic flux DC component calculation unit configured to calculate DC components of residual magnetic fluxes of three phases of the three-phase transformer after the three-phase transformer is shut down, based on the three-phase AC voltage measured by the transformer-side voltage measurement unit;
    a phase detection unit configured to detect, as a notable phase, a phase having one of a maximum absolute value and a minimum absolute value from among the DC components of the residual magnetic fluxes of the three phases calculated by the residual magnetic flux DC component calculation unit;
    a power-supply-side voltage measurement unit configured to measure a three-phase AC voltage on the power supply side of the circuit-breaker; and
    a closing unit configured to close the circuit-breaker,
    wherein the phase detection unit is configured to detect a first phase angle at which the detected notable phase of the three-phase AC voltage measured by the power-supply-side voltage measurement unit takes a peak value having a polarity opposite to a polarity of the DC component of the residual magnetic flux of the notable phase calculated by the residual magnetic flux DC component calculation unit;
    wherein the closing unit is configured to close the circuit-breaker at the notable phase by the detected first phase angle;
    wherein the phase detection unit is configured to detect a second phase angle at which the detected notable phase from the three-phase AC voltage measured by the power-supply-side voltage measurement unit becomes a zero point after the detected first phase angle; and
    wherein the closing unit is configured to close the circuit-breaker at two phases other than the notable phase by the detected second phase angle.

2. The magnetizing inrush current suppressing device according to claim 1, wherein the residual magnetic flux DC component calculation unit calculates polarities and values of the DC components of the residual magnetic fluxes based on peak values of the residual magnetic fluxes.

3. The magnetizing inrush current suppressing device according to claim 1, wherein the phase detection unit detects the second phase angle by a phase angle obtained after an elapse of a preset time from the detected first phase angle.

4. A magnetizing inrush current suppressing method of controlling a circuit-breaker which opens and closes a connection between a three-phase transformer and a three-phase AC power supply and in which a capacitor is connected between poles of the circuit-breaker, to suppress a magnetizing inrush current, comprising:
    measuring a three-phase AC voltage on the three-phase transformer side of the circuit-breaker;
    calculating DC components of residual magnetic fluxes of three phases of the three-phase transformer after the three-phase transformer is shut down, based on the measured three-phase AC voltage on the three-phase transformer side;
    detecting, as a notable phase, a phase having one of a maximum absolute value and a minimum absolute value from among the calculated DC components of the residual magnetic fluxes of the three phases;
    measuring a three-phase AC voltage on the power supply side of the circuit-breaker;
    detecting a first phase angle at which the detected notable phase of the measured three-phase AC voltage on the power supply side takes a peak value having a polarity opposite to a polarity of the calculated DC component of the residual magnetic flux of the notable phase;

closing the circuit-breaker at the notable phase by the detected first phase angle;

detecting a second phase angle at which the detected notable phase of the measured three-phase AC voltage on the power supply side becomes a zero point after the detected first phase angle; and closing the circuit-breaker at two phases other than the notable phase by the detected second phase angle.

5. The magnetizing inrush current suppressing method according to claim 4, further comprising calculating polarities and values of the DC components of the residual magnetic fluxes based on peak values of the residual magnetic fluxes.

6. The magnetizing inrush current suppressing method according to claim 4, further comprising detecting the second phase angle by a phase obtained after an elapse of a preset time from the detected first phase angle.

* * * * *